(12) United States Patent
Wang

(10) Patent No.: US 8,284,543 B2
(45) Date of Patent: Oct. 9, 2012

(54) STRUCTURE OF KEYBOARD COMBINABLE WITH ELECTRONIC DEVICE

(75) Inventor: Tsung-Han Wang, Hsin Chuang (TW)

(73) Assignee: Unication Co., Ltd., Hsin-Chuang, Taipei Hsien (TW)

( * ) Notice: Subject to any disclaimer, the term of this patent is extended or adjusted under 35 U.S.C. 154(b) by 591 days.

(21) Appl. No.: 12/539,601

(22) Filed: Aug. 11, 2009

(65) Prior Publication Data

US 2011/0037701 A1 Feb. 17, 2011

(51) Int. Cl.
*H05K 5/00* (2006.01)

(52) U.S. Cl. ......... 361/679.01; 361/679.11; 361/679.18; 361/679.2; 361/679.17

(58) Field of Classification Search ............... 361/679.1, 361/679.12, 679.13, 679.14, 679.15, 679.16, 361/679.18, 679.19, 679.2, 697.01, 679.05, 361/679.08, 679.09, 679.11, 679.17, 679.29, 361/679.55; 345/169; 400/682, 472–479, 400/479.1, 479.2, 480–491, 491.1, 491.2, 400/491.3, 492, 493, 493.1, 493.2, 494, 495, 400/495.1, 496
See application file for complete search history.

(56) References Cited

U.S. PATENT DOCUMENTS

| | | | |
|---|---|---|---|
| 5,055,839 A * | 10/1991 | Davis et al. | 341/22 |
| 5,644,469 A * | 7/1997 | Shioya et al. | 361/679.06 |
| 6,262,885 B1 * | 7/2001 | Emma et al. | 361/679.05 |
| 6,882,524 B2 * | 4/2005 | Ulla et al. | 361/679.09 |

* cited by examiner

*Primary Examiner* — Jinhee Lee
*Assistant Examiner* — Binh Tran
(74) *Attorney, Agent, or Firm* — Cheng-Ju Chiang

(57) ABSTRACT

A structure of a keyboard is combinable with an electronic device, and includes a keyboard body and a frame. The frame is of a U-shape having two limbs that has end portions slidably fit in elongate slots defined in two side walls of the keyboard body to be movable along the slots and rotatable with respect thereto. When the keyboard body and the frame are assembled together, the keyboard structure defines in a top thereof a receptacle for receiving and retaining the electronic device. The keyboard body includes a signal output structure engageable with a signal transmission interface of the electronic device. When combined together for operation, the electronic device is movable with the frame to expose keys of the keyboard. The electronic device is detachable from the keyboard structure for independent operation thereby reducing the overall size for easy carrying.

11 Claims, 7 Drawing Sheets

STRUCTURE OF KEYBOARD COMBINABLE WITH ELECTRONIC DEVICE

TECHNICAL FIELD OF THE INVENTION

The present invention generally relates to a structure of keyboard that is combinable with an electronic device, and particularly to a keyboard structure that is readily combined with and/or detached from a portable electronic device to form a unitary device, wherein the portable electronic device is a device that comprises a touch panel for receiving input operations, such as a mobile phone, a palmtop computer, a game device, a personal digital assistant (PDA), an MP4 device, or other similar devices or other devices having multiple functions, so that after the combination of the keyboard of the present invention with the electronic device, the keyboard that is additionally mounted can be used for operation and further, the keyboard, when not in use, can be detached from the electronic device to allow the electronic device to be operated in an independent manner with the touch panel.

DESCRIPTION OF THE PRIOR ART

A known electronic device, such as a mobile phone, a palmtop computer, a game device, a PDA, an MP4 device, or other electronic device having similar functions, is provided in such a form that the input and operation thereof are realized in two ways, one being a keyboard or a keypad, and the other being a liquid crystal touch panel. Both ways of input and operations for electronic devices have advantages and disadvantages.

Input with a keyboard is disadvantageous in that the keyboard occupies a substantial surface area and space of the electronic device, so that the area of a display screen is made small. For a given size of an electronic device, to make a display screen large, the keyboard and the display screen are often manufactured as separate enclosures, which are jointed in a movable manner, such as a flap cover arrangement, a foldable arrangement, or a retractable arrangement. This, however, increases the volume and weight of the whole electronic device, making it inconvenient to carry.

The solution of input through a touch panel, although effectively overcoming the problem of size and weight (for an electronic device of the same dimensions), is disadvantageous in that in performing an operation or entering an input, the image of a keyboard is shown on the display screen and is put to overlap or locate next to an image displayed on the screen, whereby the image to be observed by a user is interfered with or reduced. This problem does not occur in the device that uses a keyboard as an input device.

Thus, the present invention aims to provide a solution to overcome the problems observed in the above discussed two types of input of electronic devices.

SUMMARY OF THE INVENTION

The primary purpose of the present invention is to provide a structure of a keyboard that is combinable with an electronic device so as to be integrated with the electronic device to allow the electronic device to perform input or operation control with the keyboard and that is detachable from the electronic device to allow the electronic device to be operated with a touch panel originally provided on the electronic device.

To achieve the above purpose, the present invention provides a keyboard structure that comprises a keyboard body and a frame. The keyboard body has two opposite side walls, which define a pair of symmetric elongate slots. The keyboard body has a top surface forming stop flanges along portions of a circumference thereof. The keyboard body contains therein a keyboard circuit that comprises a signal output structure extending therefrom for engagement with a corresponding signal transmission interface of an electronic device. The frame comprises two slide blocks, two extension arms, two hinge devices, and an outer frame member. The two slide blocks are respectively fit into the elongate slots defined in the side walls of the keyboard body to be movable frontward and backward along the elongate slots. The two extension arms are respectively and pivotally jointed to rear ends of the slide blocks by the hinge devices and extend rearward to be rotatable upward and downward with the hinge devices serving as rotation centers. The outer frame member is in the form of a U-shaped tubular member and has two limbs each having a front end forming an opening telescopically fit over the respective extension arm. The outer frame member has a top surface forming in a potion thereof a stop flange. The stop flange forms a plurality of retention hooks on an inside face of a rear wall thereof.

According to the structure described above, when the keyboard body and the frame are assembled together and set in a collapsed condition, the stop flanges formed on the top surfaces of the keyboard body and the frame define a receptacle corresponding to a bottom of a circumference of the electronic device for receiving the electronic device therein in such a way that the retention hooks are engageable with the electronic device and he signal output structure that extends from the keyboard body is engageable with the signal transmission interface of the electronic device to establish transmission and connection therebetween. When the electronic device is moved rearward with the extension of the frame, keys of the keyboard body are exposed outside to allow for operation and use. When the keyboard is not in use, the keyboard structure can be completely separated from the electronic device to reduce the overall size for easy carrying.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
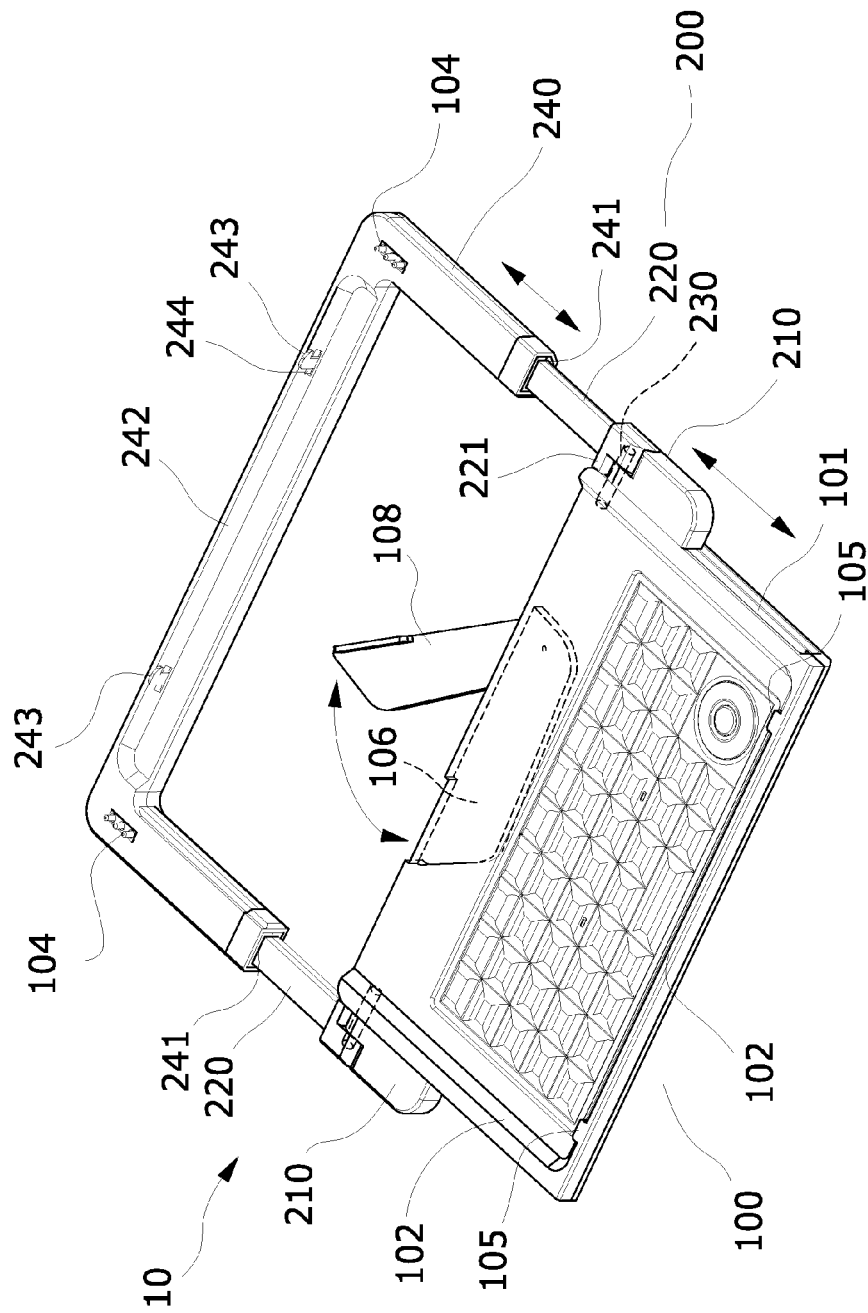
FIG. 1 is a perspective view showing a keyboard constructed in accordance with the present invention set in an expanded condition with respect to a frame.
Figure 2:
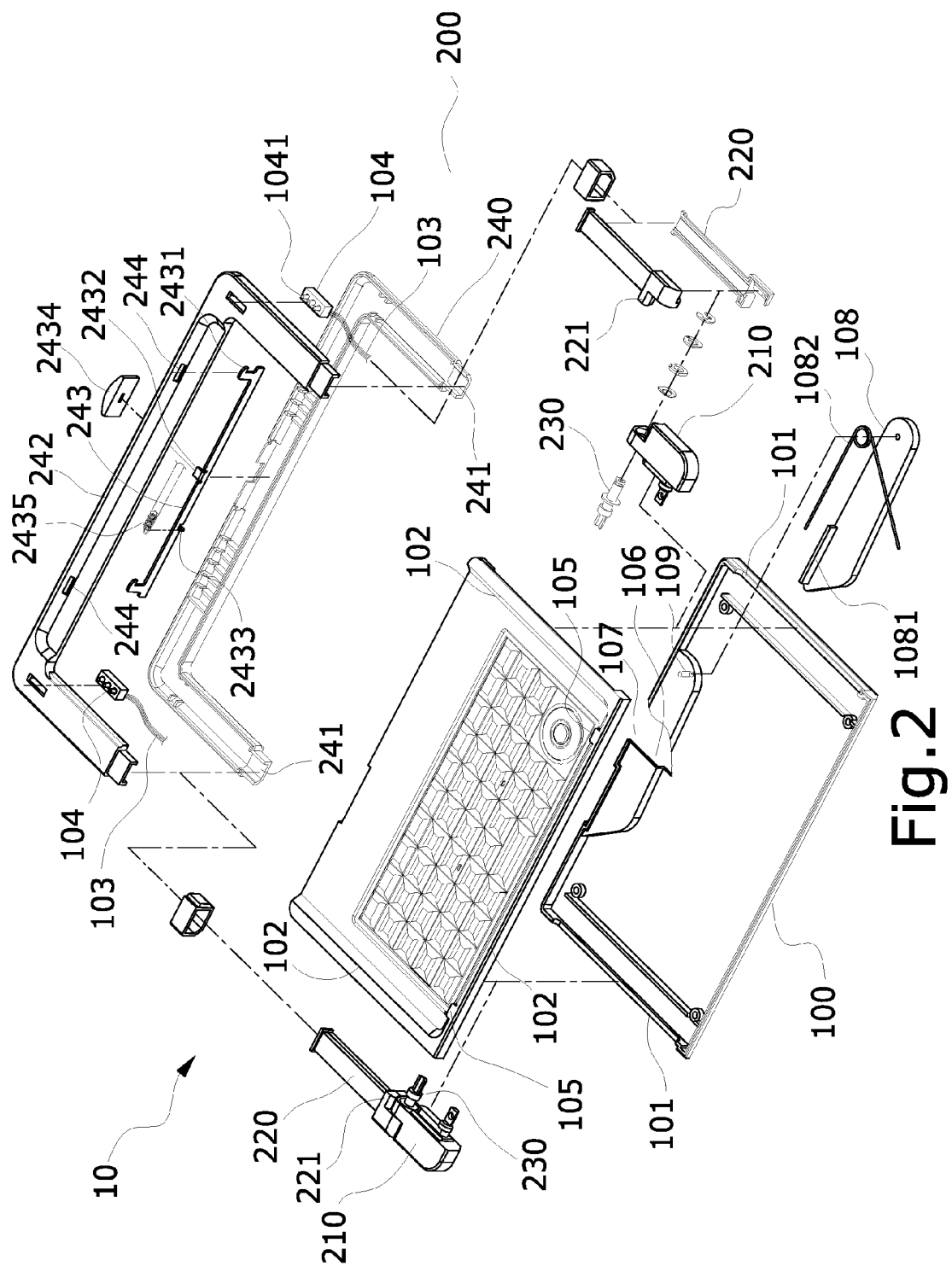
FIG. 2 is an exploded view of FIG. 1.
Figure 3:
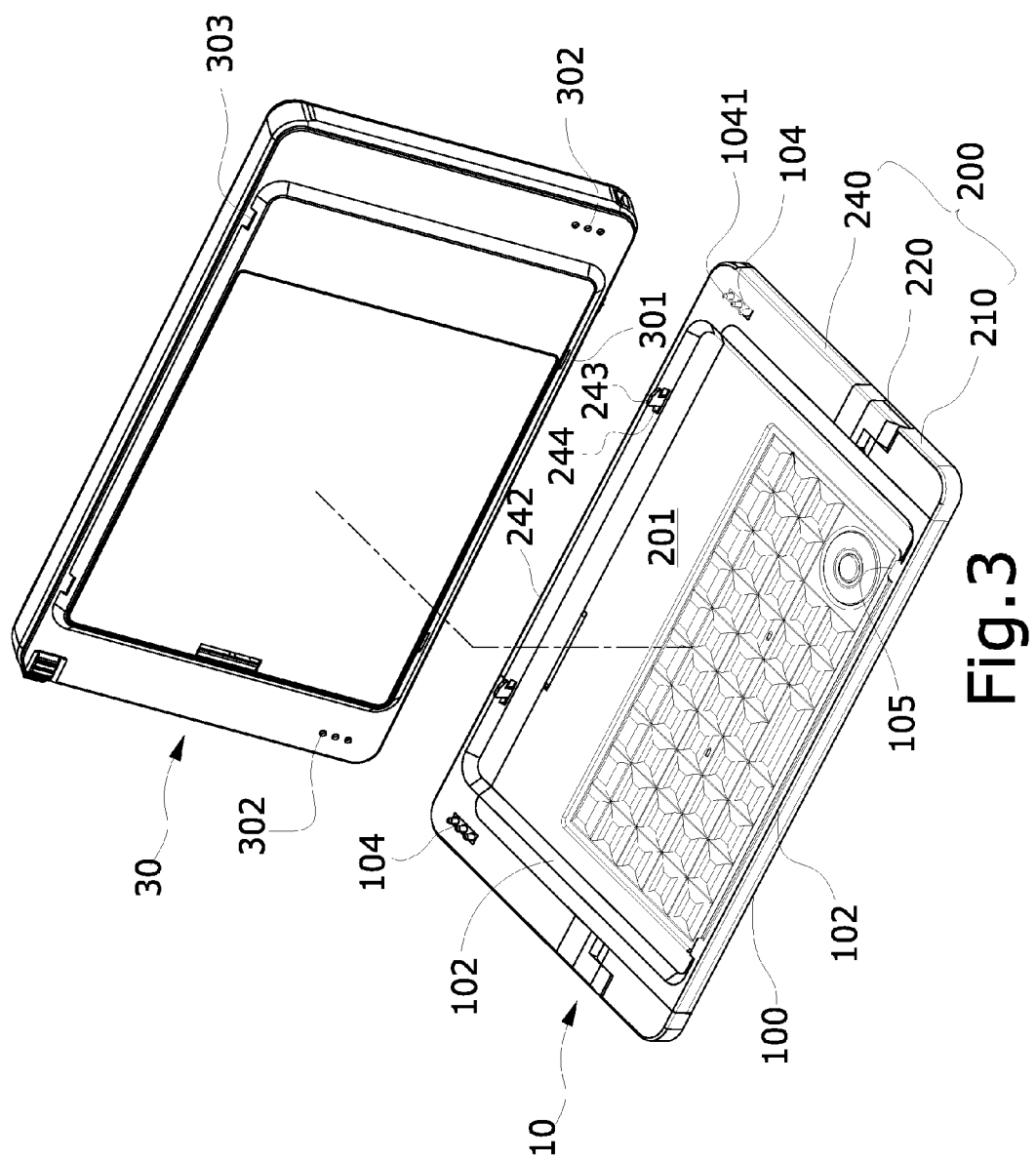
FIG. 3 is a perspective view showing a combination of the present invention and an electronic device.

As shown in FIGS. 1 to 3, a keyboard constructed in accordance with the present invention, generally designated at 10, is combinable with an electronic device, designated at 30. The keyboard 10 comprises a keyboard body 100 and a frame 200. The keyboard body 100 has two opposite side walls, which define a pair of symmetric elongate slots 101. The keyboard body 100 has a top surface forming first stop flanges 102 along portions of a circumference thereof. The keyboard body 100 contains therein a keyboard circuit that comprises a signal output structure 104 extending therefrom for engagement with a corresponding signal transmission interface 302 of the electronic device 30. The frame 200 comprises two slide blocks 210, two extension arms 220, two hinge devices 230, a retention hook 243, and an outer frame member 240. The two slide blocks 210 are respectively fit into the elongate slots 101 defined in the side walls of the keyboard body 100 to be movable frontward and backward along the elongate slots 101. The two extension arms 220 are respectively and pivotally jointed to rear ends of the slide blocks 210 by the hinge devices 230 and extend rearward to be rotatable upward and downward with the hinge devices 230 serving as rotation centers. The outer frame member 240 is in the form of a U-shaped tubular member and has two limbs each having a front end forming an opening 241 telescopically fit over the respective extension arm 220. The outer frame member 240 has a top surface forming a second stop flange 242. The second stop flange 242 forms a plurality of elongate openings 244 on an inside face of a rear wall thereof.

According to what discussed above, when the keyboard body 100 and the frame 200 are assembled together and set in a collapsed condition, the first stop flanges 102 formed on the top surfaces of the keyboard body 100 and the second stop flanges 242 formed on the top surfaces of the frame 200 define a receptacle 201 corresponding to a bottom of a circumference of an electronic device 30 (as shown in FIG. 3) for receiving the electronic device 30 therein in such a way that the retention hook 243 is engageable with retention holes 301 defined in a rear surface of the bottom of the electronic device 30 to provide a unitary device. The signal output structure 104 that projects outward from the keyboard body 100 is made engaging the corresponding signal transmission interface 302 to establish transmission of power and data between the keyboard 10 and the electronic device 30. The signal output structure 104 as discussed above is made in the form of a connector in the embodiment illustrated in FIGS. 1 and 2, comprising a flexible cable 103 that extends through hollow portions of the hinge device 230 and the extension arm 220 to penetrate into and fix inside the outer frame member 240 with conductor terminals 1041 of the signal output structure 104 exposed on the top surface of the outer frame member 240 to allow for engagement of the conductor terminals 1041 with contacts of the signal transmission interface 302 of the electronic device 30 exposed outside, whereby when the electronic device 30 and the keyboard 10 are combined together, electrical connection can be simultaneously established.

Figure 6:
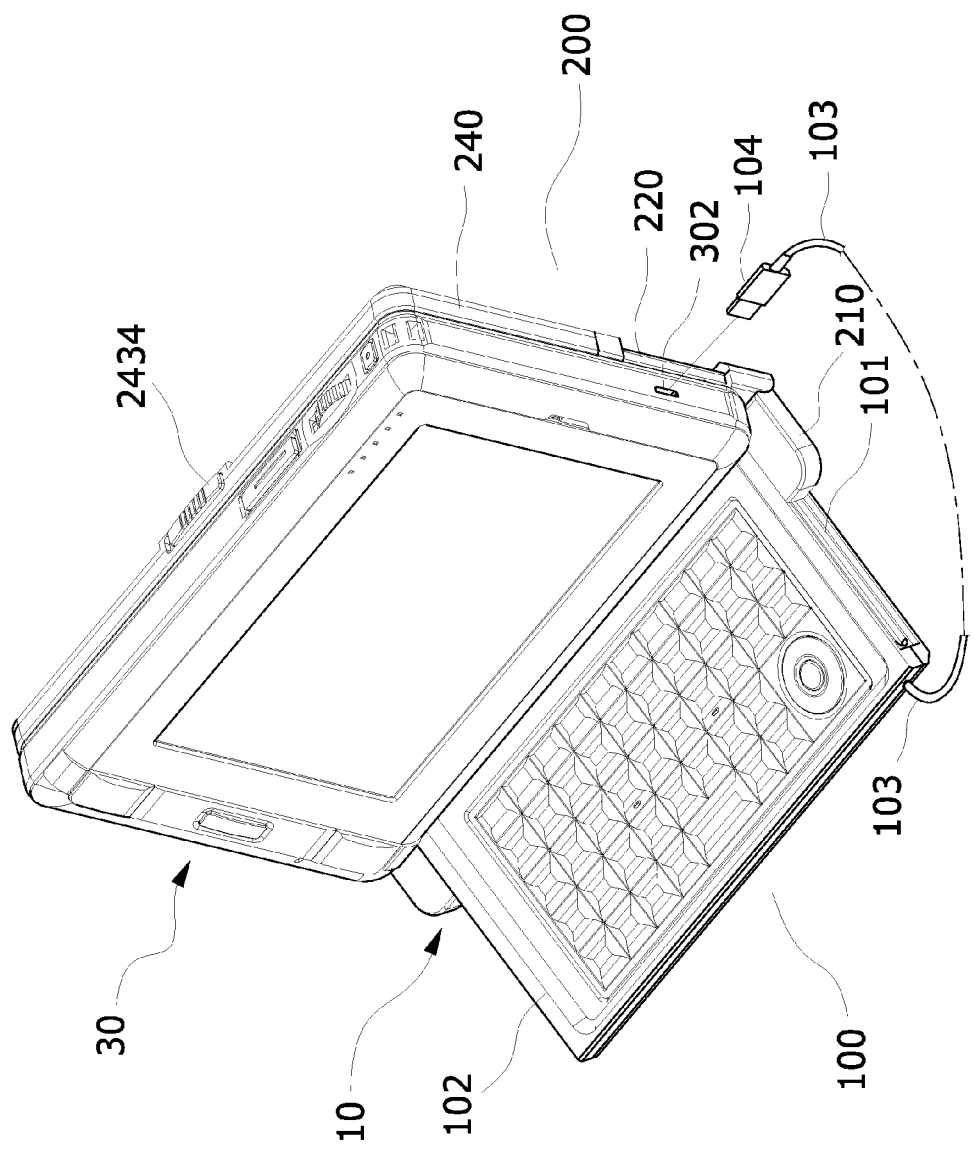
FIG. 6 is a perspective view showing a combination of a keyboard structure of another embodiment of the present invention with an electronic device.
Figure 7:
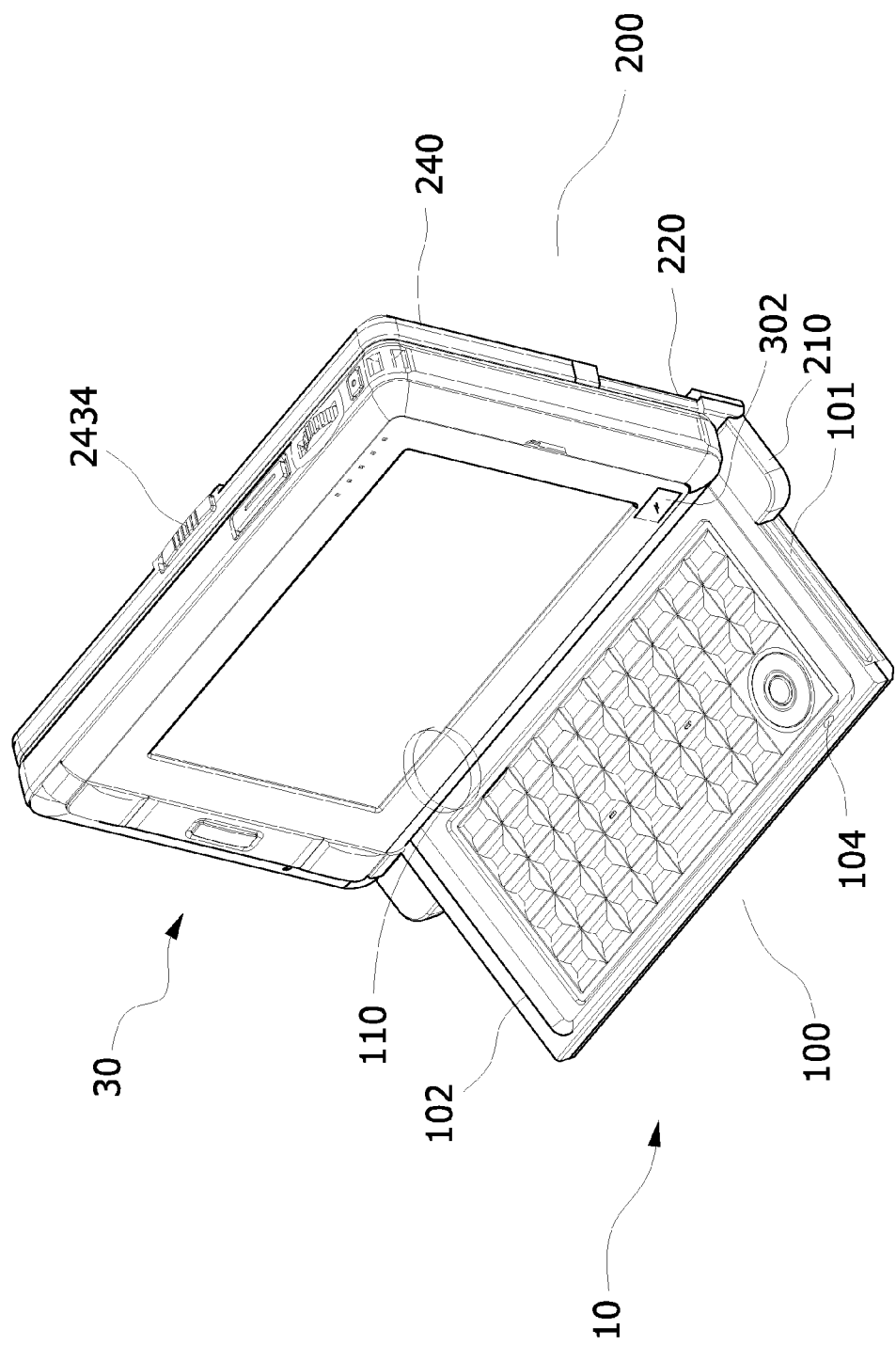
FIG. 7 is a perspective view showing a combination of a keyboard structure of a further embodiment of the present invention with an electronic device.

Further, to practice the present invention, the signal output structure 104 can be alternatively constructed to comprise a flexible cable 103 that extends outside the keyboard body 100 (as shown in FIG. 6) and has a free end forming a signal output structure 104 (such as a plug connector) that mates a signal transmission interface 302 (signal output/input connection port) of the electronic device 30. In combination, the signal output structure 104 is plugged into the signal transmission interface 302 of the electronic device 30 to similarly realize signal connection therebetween. Alternatively, the present invention may adopt a connection cable (not shown) having opposite free ends that are both provided with plug connectors, or as shown in FIG. 7, the signal output structure 104 and the signal transmission interface 302 are formed as mated infrared or Bluetooth wireless communication modules.

With the structure discussed above, the power that the keyboard circuit needs for the operation thereof can be transmitted in a wired manner through the flexible cable 103 and the signal output structure 104 for connection with and being supplied from an internally built up power source unit inside the electronic device 30. Or alternatively the keyboard body 100 contains therein a separate power source unit 110 (as indicated by phantom lines of FIG. 7, which can be a rechargeable cell, a lithium cell, or a carbon-zinc cell) for self powering.

Figure 4:
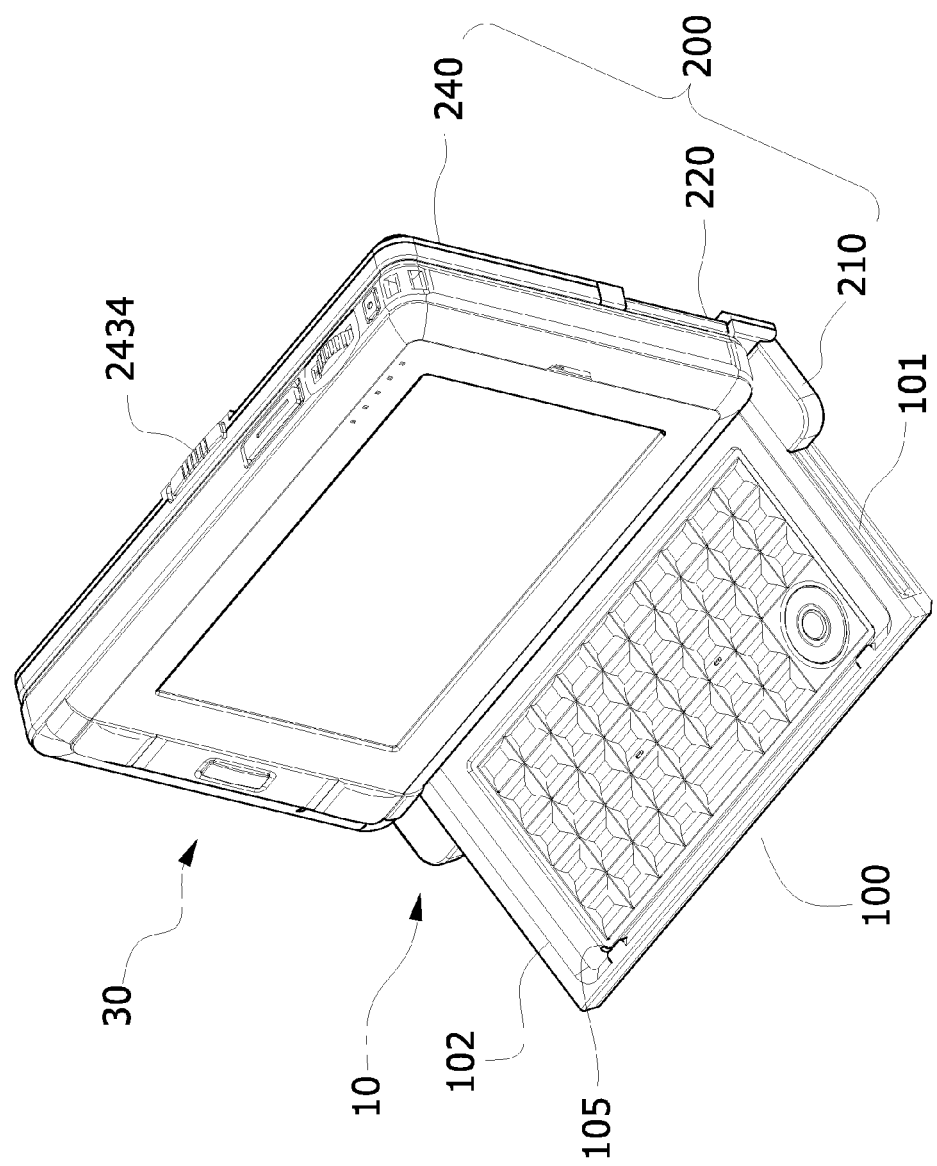
FIG. 4 is a perspective view showing the present invention in an operation condition.
Figure 5:
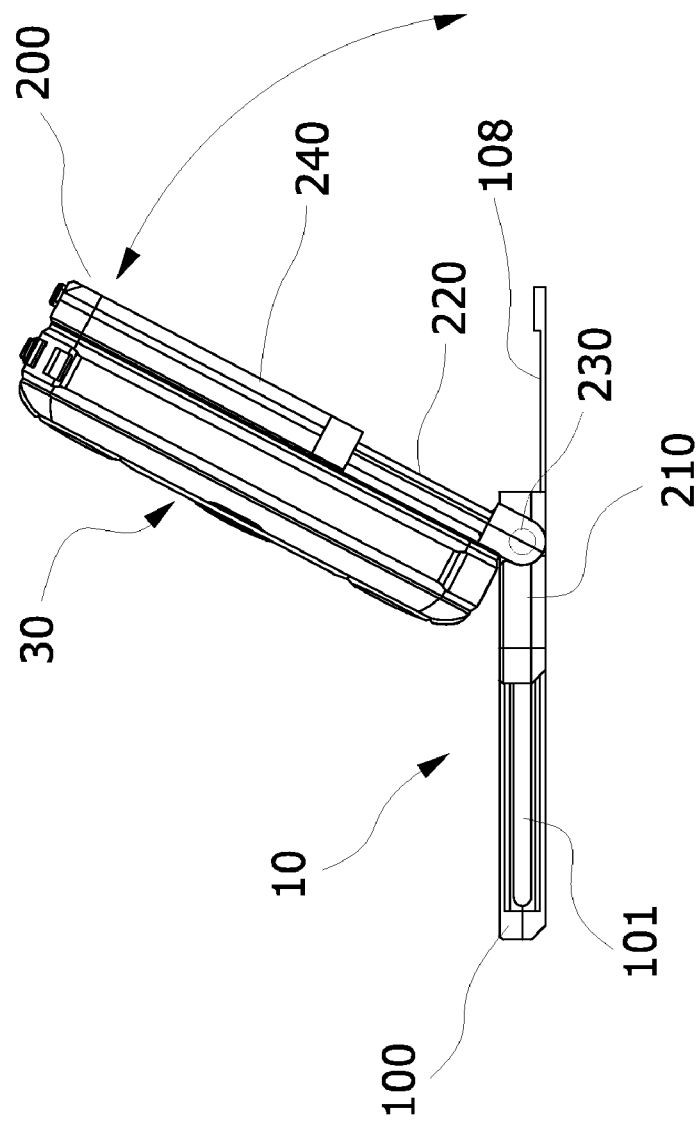
FIG. 5 is a side elevational view of FIG. 5.

To combine the keyboard 10 as described above with an electronic device 30 for operation, the frame 200 is pulled rearward to the condition illustrated in FIG. 1 or 4 to expose the keys of the keyboard body 100 by which the operation can be carried out. As described above, to facilitate visual observation of a display screen of the electronic device 30, the present invention is made so that the frame 200 (with the electronic device carried thereon) is tilted upward by a given inclination angle, as shown in FIGS. 4 and 5. When the keyboard is not used, the retention hook 243 of the keyboard 10 is released to allow separation of the keyboard 10 from the electronic device 30 and then the electronic device can be separately carried and operated individually.

Referring to FIGS. 1 and 2, as described above, the frame 200 is provided with the retention hook 243, which comprises an elongate metal bar having opposite ends each forming a raised barb 2431 projecting outside through a corresponding elongate opening 244 defined in the outer frame member 240 and movable along the elongate opening 244. The retention hook 243 forms, on an intermediate section thereof, a coupling section 2432 and a mounting section 2433, which project sideways in opposite directions. The coupling section 2432 extends outside the outer frame member 240 (projecting beyond a rear wall thereof) to couple to an operation knob 2434. The mounting section 2433 is bent laterally for fixing a spring 2435 that has an end fixed inside the outer frame member 240 for biasing the retention hook 243 at a locked position. To unlock, the operation knob 2434 is manipulated to move in a direction opposite to biasing force of the spring 2435 so as to disengage the barbs 2431 out of the retention holes 301 of the electronic device 30 by which unlocking is realized and the electronic device 30 can be removed for separate use.

Further, each extension arm 220 of the frame 200 forms an inward projecting stop block 221 at an end thereof jointing to the respective slide block 210, whereby when the frame 200 is tilted upward by rotation about a center defined by the hinge devices 230, the stop block 221 is brought into engagement with and abutting a top surface of the slide block 210 to limit further inclination of the frame 200 and thus set the inclination angle of the frame 200 at a position that is most suitable for visual observation.

In the embodiment shown in FIG. 1, the keyboard body 100 forms a plurality of hooks 105 in an inside surface of the first stop flange 102 thereof for mating slots 303 defined in a front edge of the bottom of the electronic device 30. To combine the keyboard 10 and the electronic device 30, the frame 200 is first pulled rearward and after the retention hook 243 of the frame 200 engage and hold the electronic device 30, the frame 200 is pushed forward to position (as shown in FIG. 3) to have the electronic device 30 overlapping the keyboard 10. By then, the hooks 105 of the keyboard body 100 are just fit into the slots 303 on the front edge of the electronic device 30 to prevent the electronic device 30 from separating.

Referring to the embodiment shown in FIGS. 1 and 2, the keyboard body 100 has a bottom that defines a recess 106. The recess 106 forms a cutoff 107 in a rear surface of the keyboard body 100. A support board 108 is arranged inside the recess 106. The support board 108 is pivotally mounted, at an end thereof, inside the recess 106 by a pivot pin 109, and has an opposite free end rotatable outward through the cutoff 107 to the rear side of the keyboard body 100, or rotatable in a reversed direction back into and thus stowed inside the recess 106. Thus, when set in the condition of FIGS. 4 and 5 for operation, the support board 108 can be rotated outward to extend rearward from the keyboard body 100 to enhance stability for supporting the product on for example a desktop. Further, the support board 108 (as shown in FIG. 2) is selectively provided at an outer edge thereof with a push tab 1081 extending upward. A V-shaped spring 1082 (or springs of the same function) is arranged between the support board 108 and an internal side face of the recess 106 to provide an outward-rotating biasing force so that when the frame 200 is expanded by being pulled rearward, the support board 108 is automatically sprung out for use. On the other hand, when the frame 200 is collapsed into the keyboard body 100, an inside face of the frame 200 engages and forces the push tab 1081 of the support board 108 inward for storage into the recess 106. This provides further enhancement of the efficacy of the product.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A keyboard structure, which is combinable with an electronic device, the keyboard comprising:

a keyboard body, which has two opposite side walls defining a pair of symmetric elongate slots, the keyboard body having a top surface forming first stop flanges along portions of a circumference thereof, the keyboard body containing therein a keyboard circuit that comprises a signal output structure extending therefrom projecting outward and electrically engageable with the electronic device; and a frame, which comprises two slide blocks, two extension arms, two hinge devices, a retention hook and an outer frame member, the slide blocks being respectively fit into the elongate slots defined in the side walls of the keyboard body to be movable frontward and backward along the elongate slots, the extension arms being respectively and pivotally jointed to rear ends of the slide blocks by the hinge devices and rotatable upward and downward about rotation centers defined by the hinge devices, the outer frame member comprising a tubular member having two downward-facing openings respectively and telescopically fit over the extension arms, the outer frame member having a top surface forming a second stop flange, the second stop flange forming a plurality of elongate openings on an inside face of a rear wall thereof;

wherein the first stop flanges formed on the top surfaces of the keyboard body and the second stop flanges formed on the top surfaces of the outer frame member define therebetween a receptacle corresponding to a bottom contour of the electronic device for receiving the electronic device therein in such a way that the retention hook is engageable with retention holes defined in the bottom of the electronic device for retention and fixation, so as to make the electronic device movable in unison with the outer frame member.

2. The keyboard structure according to claim 1, wherein the signal output structure comprises a connector, which comprises a flexible cable extending through hollow portions of the hinge device and the extension arm to penetrate into and fix inside the outer frame member with conductor terminals thereof exposed on the top surface of the outer frame member.

3. The keyboard structure according to claim 1, wherein the signal output structure comprises a flexible cable that extends outside the keyboard body and forms a plug connector.

4. The keyboard structure according to claim 1, wherein signal output structure comprises a wireless signal transmission structure.

5. The keyboard structure according to claim 1, wherein the retention hook of the frame comprises an elongate metal bar having opposite ends each forming a raised barb projecting outside through the corresponding elongate opening and movable along the elongate opening, the retention hook having an intermediate section forming a coupling section and a mounting section, which project sideways in opposite directions, the coupling section extending outside the outer frame member to couple to an operation knob, the mounting section being coupled with a spring arranged inside the outer frame member for biasing the retention hook toward a locked position.

6. The keyboard structure according to claim 1, wherein each extension arm forms an inward projecting stop block at an end thereof jointing to the respective slide block, whereby when the extension arm is rotated to an upper position, the stop block is brought into engagement with and abutting a top surface of the slide block.

7. The keyboard structure according to claim 1, wherein the keyboard body forms a plurality of hooks in an inside surface of the first stop flange thereof for mating slots defined in a front edge of the electronic device.

8. The keyboard structure according to claim 1, wherein the keyboard body has a bottom that defines a recess, the recess forming a cutoff in a rear side of the keyboard body to receive therein a support board, the support board being is pivotally mounted, at an end thereof, inside the recess and has an opposite free end selectively rotatable outward through the cutoff on the rear side of the keyboard body or rotatable in a reversed direction back into the recess.

9. The keyboard structure according to claim 8, wherein the support board has an outer edge forming an upward-extending push tab, and a spring is arranged between the support board and an internal side face of the recess for biasing the support board outward.

10. The keyboard structure according to claim 1, wherein the keyboard circuit is connected to a power source unit inside the electronic device by a cable through the signal output structure.

11. The keyboard structure according to claim 1, wherein the keyboard circuit is connected to a battery unit accommodated inside the keyboard body.

* * * * *